(12) United States Patent
Hamamoto et al.

(10) Patent No.: US 7,653,077 B2
(45) Date of Patent: *Jan. 26, 2010

(54) TRANSLATOR FOR IP NETWORKS, NETWORK SYSTEM USING THE TRANSLATOR, AND IP NETWORK COUPLING METHOD THEREFOR

(75) Inventors: Shinichi Hamamoto, Yamato-chi (JP); Ken Watanabe, Kawasaki (JP); Kazuaki Tsuchiya, Yokohama (JP); Naoya Ikeda, Ebina (JP)

(73) Assignee: Hitachi, Ltd., Tokyo (JP)

( * ) Notice: Subject to any disclaimer, the term of this patent is extended or adjusted under 35 U.S.C. 154(b) by 185 days.

This patent is subject to a terminal disclaimer.

(21) Appl. No.: 11/892,189

(22) Filed: Aug. 21, 2007

(65) Prior Publication Data

US 2008/0043762 A1 Feb. 21, 2008

Related U.S. Application Data

(63) Continuation of application No. 10/175,496, filed on Jun. 20, 2002, now Pat. No. 7,283,540, which is a continuation of application No. 09/472,838, filed on Dec. 28, 1999, now Pat. No. 7,088,726, which is a continuation of application No. 08/887,123, filed on Jul. 2, 1997, now Pat. No. 6,038,233.

(30) Foreign Application Priority Data

Jul. 4, 1996 (JP) .................................. 8-174768

(51) Int. Cl.
 *H04L 12/66* (2006.01)
(52) U.S. Cl. ....................................... 370/401; 370/466

(58) Field of Classification Search ...................... None
See application file for complete search history.

(56) References Cited

U.S. PATENT DOCUMENTS 5,793,763 A 8/1998 Mayes et al. ................. 370/466

(Continued)

FOREIGN PATENT DOCUMENTS

JP 5199225 8/1993

(Continued)

OTHER PUBLICATIONS

"Internet Protocol: Darpa Internet Program Protocol Specification", Information Sciences Institute University of Southern California, Sep. 1981.

(Continued)

*Primary Examiner*—Min Jung
(74) *Attorney, Agent, or Firm*—Brundidge & Stanger, P.C.

(57) ABSTRACT

A translator for coupling a first IPv4 network and a second IPv6 network having different addressing architectures for IP addresses so as not to exhaust the IP addresses of one of the two networks, a network system using the translator, and a network coupling method. When a packet is transferred from the IPv6 network to the IPv4 network, the translator assigns any of previously prepared IPv4 addresses to an IPv6 address stored in a source storing field of the IPv6 packet. The assigned address is stored in a source storing field of an IPv4 packet. A packet translation unit assigns the foregoing IPv6 address to an IPv4 address stored in a destination storing field of the IPv4 packet, when a packet is transferred from the IPv4 network to the IPv6 network, and stores this address in a destination storing field of the IPv6 packet.

10 Claims, 11 Drawing Sheets

U.S. PATENT DOCUMENTS

| | | | |
|---|---|---|---|
| 5,802,053 A | 9/1998 | Bollella et al. | 370/465 |
| 5,802,285 A | 9/1998 | Hirviniemi | 370/401 |
| 6,038,233 A | 3/2000 | Hamamoto et al. | |
| 7,088,726 B1 | 8/2006 | Hamamoto et al. | |
| 7,158,526 B2 * | 1/2007 | Higuchi et al. | 370/401 |
| 7,248,591 B2 | 7/2007 | Hamamoto et al. | |
| 7,251,247 B2 | 7/2007 | Hamamoto et al. | |
| 7,283,540 B2 * | 10/2007 | Hamamoto et al. | 370/401 |

FOREIGN PATENT DOCUMENTS

| | | |
|---|---|---|
| JP | 5344122 | 12/1993 |
| JP | 06318945 | 11/1994 |

OTHER PUBLICATIONS

S. Deering "Internet Protocol: Version 6 (IPv6)", Xerox PARC, Dec. 1981.

C. Huitema "IPv6 the new Internet Protocol", 7.4 Point of Controversy, pp. 158-161.

The New Internet Protocol IPv6, Unix Magazine, vol. 10, No. 12, pp. 56-62, 1995.12. (Japane language version).

Unix Magazine, Unix Review, Jun. 1995, pp. 31-38 (English version).

I. Morishita, et al, "Key to Utilization of the Internet by Business: Second-generation Firewall!!, Part 2", Computer & Network LAN, vol. 13, No. 11, pp. 89-95, Ohmsha Ltd., Nov. 1, 1995.

* cited by examiner

FIG. 7

ADDRESS TRANSLATION INFORMATION TABLE 35

| IPv6 ADDRESS | ASSIGNED IPv4 ADDRESS | OPTION |
|---|---|---|
| ∷1111:2222:3333 | 192.168.10.1 | ... |
| ∷1234:5678:9abc | 192.168.10.3 | ... |
| ... | ... | ... |
| UNUSED | UNUSED | UNUSED |
| UNUSED | UNUSED | UNUSED |

Columns: 91, 92, 93

FIG. 8

ADDRESS TRANSLATION INFORMATION EXCHANGE PACKET

| IPv6 ADDRESS | ASSIGNED IPv4 ADDRESS | OPTION |
|---|---|---|

Columns: 101, 102, 103

TRANSLATOR

IPv4 HOST

IPv6 HEADER FORMAT

IPv4 HEADER FORMAT

IPv6 ADDRESS FOR INTERCONNECTION BETWEEN V6 NODE AND V4 NODE

IPv4-compatible IPv6 ADDRESS

IPv4-mapped IPv6 ADDRESS

TRANSLATOR FOR IP NETWORKS, NETWORK SYSTEM USING THE TRANSLATOR, AND IP NETWORK COUPLING METHOD THEREFOR

The present application is a continuation of application Ser. No. 10/175,496, filed Jun. 20, 2002, now U.S. Pat. No. 7,283,540; which is a continuation of application Ser. No. 09/472,838, filed Dec. 28, 1999, now U.S. Pat. No. 7,088,726; which is a continuation of application Ser. No. 08/887,123, filed Jul. 2, 1997, now U.S. Pat. No. 6,038,233, the contents of which are incorporated herein by reference.

BACKGROUND OF THE INVENTION

The present invention relates to an Internet protocol (IP) network coupling method, a translator for IP networks, and a network system using the translator which are intended to couple a first class IP network in which a plurality of devices of interest are assigned IP addresses of a first class so as to prevent the assignment of the same IP address to different devices and a second class IP network in which a plurality of devices of interest are assigned IP addresses of a second class so as to prevent the assignment of the same IP address to different devices.

The protocol most widely known at present as a protocol for network layers used in the TCP/IP communication is the internet protocol (IP). The IP functions to provide an addressing service for specifying a destination to be communicated with among a large number of nodes connected to a network, and so on, which are the same services provided by the third layer of OSI (Open Systems Interconnection) reference model. Currently, the IP of version 4 (hereinafter called "IPv4") is commonly used. The IPv4 specification is disclosed in "INTERNET PROTOCOL; DARPA INTERNET PROGRAM PROTOCOL SPECIFICATION", Information Science Institute University of Southern California, September, 1981. A format defined for a header used in the IPv4 (hereinafter called "IPv4 header") is as shown in FIG. 11B.

In the IPv4 header, a "version" field stores the version number, i.e., "4". A "header length" field stores the length of the IPv4 header itself. A "service type" field stores information indicative of a service quality of communication processing. A "packet length" field stores the size of an entire packet which includes a data block treated by the IP and the IPv4 header. Information directed down from an upper layer is treated as a single data block in the IP, and the data block is appended with an IPv4 header in the IP and then sent to a lower layer.

Conversely, an IPv4 header included in a packet sent from a lower layer is analyzed by the IP, and a data portion of the packet is sent up to an upper layer depending on the analysis results. An "identifier" field stores an identifier used as reference information when data is passed to an upper layer. A "flag" field stores control information associated with fragmentation of a packet. A "fragment offset" field stores information indicating where fragmented data (fragment) has been positioned in original data. A "time to live" field stores a time during which an associated packet is allowed to exist in a network. A "protocol" field stores information indicating which protocol an upper layer employs. A "header checksum" field stores a checksum for the IP header. A "source IP address" field stores the IP address of a source. A "destination IP address" field stores the IP address of a destination. The IP addresses are assigned to respective nodes connected to a network, and are set respectively to unique values in the network.

While the IP having the specification as mentioned above is currently spreading rapidly over a variety of communication services together with the increasing popularity of the internet, the IP is confronted with a grave problem of an exhausted supply of IP addresses.

As countermeasures for solving this problem, the IP of version 6 (hereinafter called "IPv6") has been proposed at present. The IPv6 specification is disclosed in S. Deering "INTERNET PROTOCOL: Version 6 (IPv6)", Xerox, PARC, December 1981.

A format defined for a header used in the IPv6 (hereinafter called "IPv6 header") is as shown in FIG. 11A. In the IPv6 header, a "version" field stores the version number, i.e., "6". A "priority" field stores the priority of processing executed by a router in a network for relaying a packet. A "flow label" field is used to store an identifier for performing a priority control or the like. A "payload length" field stores the length of a data portion calculated by subtracting an IPv6 header portion from a packet. A "next header identifier" field stores an identifier for identifying which header of upper layer protocol, or which IPv6 extended header follows the IPv6 header. A "hop limit" field stores a maximum number of times of transfers for an associated packet. A "source IP address" field stores the IP address of a source, and a "destination IP address" field stores the IP address of a destination. Additionally, in the IPv6 header, the "source IP address" field and the "destination IP address" field are respectively extended from 32 bits to 128 bits. The extended address fields enable an increased number of nodes to be connected to a network.

Although the IPv6 has extended fields for storing the IP addresses, additional modifications partially added to the header and associated processing give rise to another problem that the IPv6 is not compatible with the existing IPv4.

From now on, the IPv6 will be implemented as the network protocol in nodes newly connected to a network, so that addresses conforming to the IPv6 will be assigned to these nodes as their network addresses. However, since simultaneous replacement of the previous network protocol with the IPv6 in all existing nodes is actually impossible, it is anticipated that coexistence of IPv4 nodes and IPv6 nodes will last for a long time. In addition, a portion of existing nodes (particularly peripherals), for which the replacement of the protocol is difficult, will continue to use the IPv4 as before.

It is therefore anticipated that nodes having the IPv6 implemented therein (IPv6 nodes) and nodes having the IPv4 implemented therein (IPv4 nodes) will co-exist in a single network in the future.

However, since the IPv6 and the IPv4 employ different header formats and so on from each other, IPv6 nodes and IPv4 nodes cannot be simply coupled.

As a solution for this problem, a connecting method using a translator has been proposed, for example, as illustrated in FIG. 13.

Referring specifically to FIG. 13, an IPv6 network 52 to which an IPv6 node (IPv6 host) 10 is connected and an IPv4 network 54 to which an IPv4 node (IPv4 host) 20 is connected are mutually connected through a translator 30. The IPv4 host 20 is designated an address uniquely assigned in the IPv4 network 54 (hereinafter called "IPv4 address"), while the IPv6 host 10 is designated both of an address uniquely assigned in the IPv6 network 52 (hereinafter called "IPv6 address") and an IPv4 address. The IPv6 host 10 represents itself with the IPv6 address when communicating with another IPv6 host (not shown) in the IPv6 network 52, and represents itself with an IPv4 address when communicating with the IPv4 host 20 in the IPv4 network 54. For example, for sending a packet from the IPv6 host 10 to the IPv4 host 20, the IPv6 host 10 stores its own IPv4 address (of the IPv6 host 10) in the "source IP address" field (see FIG. 11A) in a form as shown in FIG. 12A, and stores the IPv4 address of the destination (the IPv4 host 20) in the "destination IP address" field (see FIG. 11A) in a form as shown in FIG. 12B, when generating a header for the packet to be sent. In FIG. 12A, the lower 32 bits within the 128 bits reserved for the HIP address" field are used for storing address information with the remaining bits being set at "0". The address represented in such a format is commonly called an "IPv4" compatible-IPv6 address". In FIG. 12B, in turn, the lower 32 bits within the 128 bits reserved for the "IP address" field are used for storing address information, with 47th to 32nd bits being set at "1" and the remaining bits being set at "0". The address represented in such a format is commonly called an "IPv4"-mapped-IPv6 address". Then, the header containing predetermined information and data to be sent is forwarded to the translator 30 as a single packet.

The translator 30 translates the packet sent thereto into a packet for the IPv4 network 54. Specifically, the lower 32 bits, i.e., the IPv4 address of the IPv6 host 10 is retrieved from the foregoing IPv4-compatible-IPv6 address included in the header of the sent packet, and stored in the "source IP address field" of the IPv4 header shown in FIG. 11B. Simultaneously, the lower 32 bits, i.e., the IPv4 address of the source IPv4 host 20 are retrieved from the foregoing IPv4-mapped-IPv6 address included in the header of the sent packet, and stored in the "destination IP address" field of the IPv4 header shown in FIG. 11B. Subsequently, other necessary items are set in the header, and the header is sent together with the data to be sent to the IPv4 host 20 as a single packet.

The use of the foregoing method does enable an IPv6 node to interconnect with an IPv4 node. This method, however, needs to additionally assign an IPv4 address to an IPv6 node, thus causing a contradiction. The IPv6 addresses were introduced because an available number of IPv4 addresses had been lacking as mentioned above. Thus, if the IPv6 addresses intended to overcome this problem promoted the exhaustion of the IPv4 addresses by contraries, it would be meaningless to employ the IPv6 addresses.

SUMMARY OF THE INVENTION

In view of the problem described above, it is an object of the present invention to provide an IP network coupling method, a translator for IP networks, and a network system using the translator which are capable of coupling two networks which employ different addressing architectures for IP addresses, due to a difference in IP version or the like, without exhausting IP addresses used in either of the two networks.

According to one aspect of an IP network coupling method of the present invention to achieve the above object, there is provided a method of coupling IP networks for mutually coupling through a translator a first IP network, wherein a plurality of devices of interest are assigned first IP addresses such that the same first IP address is not assigned to two or more devices of interest, and a second IP network, wherein a plurality of devices of interest are assigned second IP addresses such that the same second IP address is not assigned to two or more devices of interest, the method comprising the steps of:

when initiating a communication between a first device of interest which is one of a plurality of devices of interest existing in the first IP network and a second device of interest which is one of a plurality of devices of interest existing in the second IP network, assigning any of a plurality of previously prepared first IP addresses to a second IP address assigned to the second device of interest;

communicating between the second device of interest and the translator using the second IP address assigned to the second device of interest, and communicating between the translator and the first device of interest using the assigned first IP address; and releasing the assigned first IP address after termination of the communication.

According to one aspect of an IP network translator of the present invention to achieve the above object, there is provided a translator for coupling a first IP network, wherein a plurality of devices of interest are assigned first IP addresses such that the same first IP address is not assigned to two or more devices of interest, and a second IP network, wherein a plurality of devices of interest are assigned second IP addresses such that the same second IP address is not assigned to two or more devices of interest, the translator comprising:

a header translator which translates a header between a first IP packet used in the first IP network and a second IP packet used in the second IP network in order to exchange information between the first IP network and the second IP network; and a storage which stores a plurality of first IP ho addresses different from each other;

wherein, for a header translation performed to send information from the second IP network to the first IP network, any of the plurality of first IP addresses stored in the storage is assigned to a second IP address stored in a source storing field included in an IP header of the second IP packet, and the assigned first IP address is stored in a source storing field included in an IP header of the first IP packet; and for a header translation performed to send information from the first IP network to the second IP network, the second IP address stored in the source storing field included in the IP header of the second IP packet is assigned to a first IP address stored in a destination storing field included in the IP header of the first IP packet, and the assigned second IP address is stored in a destination storing field included in the IP header of the second IP packet.

According to another aspect of the IP network translator of the present invention to achieve the above object, there is provided a network system comprising:

a translator for mutually coupling a first IP network, wherein a plurality of devices of interest are assigned first IP addresses such that the same first IP address is not assigned to two or more devices of interest, and a second IP network, wherein a plurality of devices of interest are assigned second IP addresses such that the same second IP address is not assigned to two or more devices of interest; and a first device A of interest which is one of the plurality of devices of interest existing in the first IP network, said first device A of interest comprising:

a storage which stores a plurality of first IP addresses which are different from each other;

an address translator which is operative when a first IP packet including data to be transmitted to a second device B of interest to the first network, the second device B of interest being one of a plurality of devises of interest existing in the second IP network, to assign any of the plurality of first IP addresses stored in the storage to a second IP address assigned to the second device B of interest, and store the assigned first IP address to a destination storing field included in an IP header of the first IP packet; and a sender which sends address translation information including at least the second IP address assigned to the second device B of interest and the first IP address assigned to the second IP address, and said translator comprising:

a storage which stores the address translation information sent from the first device A of interest; and a packet translator which translates a packet between the first IP network and the second IP network using the address translation information.

Other objects, features and advantages of the present invention will become apparent from reading the following description of the embodiments of the invention taken in conjunction with the accompanying drawings.

BRIEF DESCRIPTION OF THE DRAWINGS

FIG. 7 is an explanatory diagram showing an example of an address translation information table provided in each of the IPv4 hosts of types A, B and the IPv4/IPv6 translator connected to the network of FIG. 1;

FIG. 8 is an explanatory diagram showing a format for a packet used to transmit information stored in the address translation information table of FIG. 7;

DESCRIPTION OF THE PREFERRED EMBODIMENTS

Embodiments of the present invention will hereinafter be described with reference to the accompanying drawings.

Figure 1:
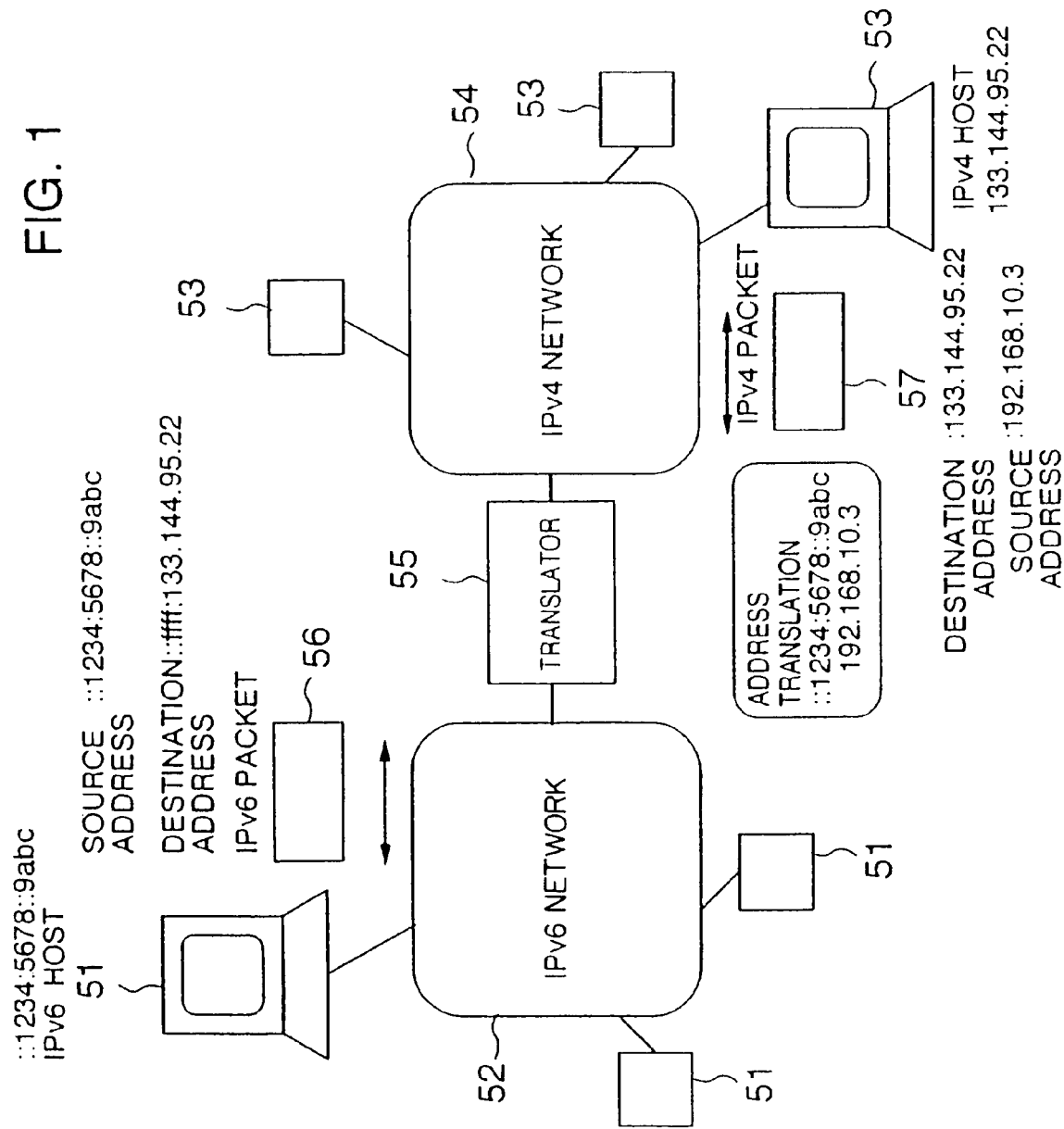
FIG. 1 is a schematic diagram illustrating an example of a network to which the present invention is applied.
Figure 11A:
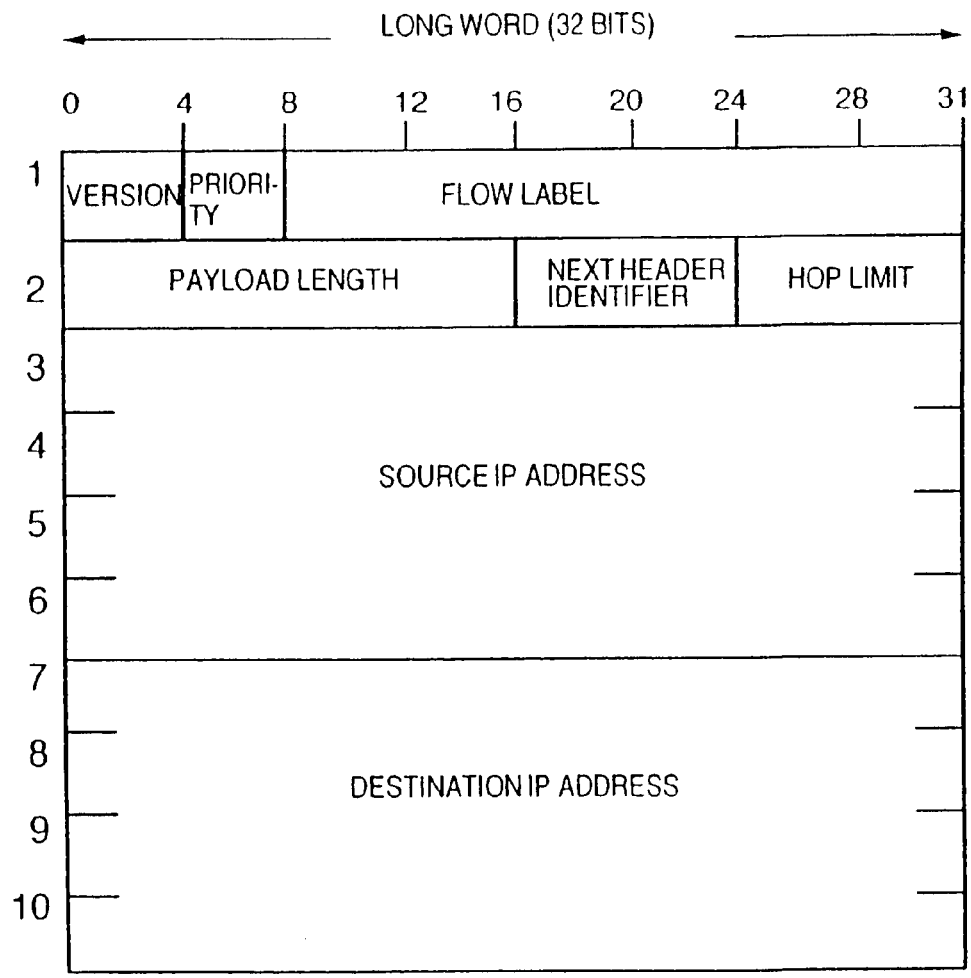
FIG. 11A is an explanatory diagram of a format for an IPv6 header.
Figure 11B:
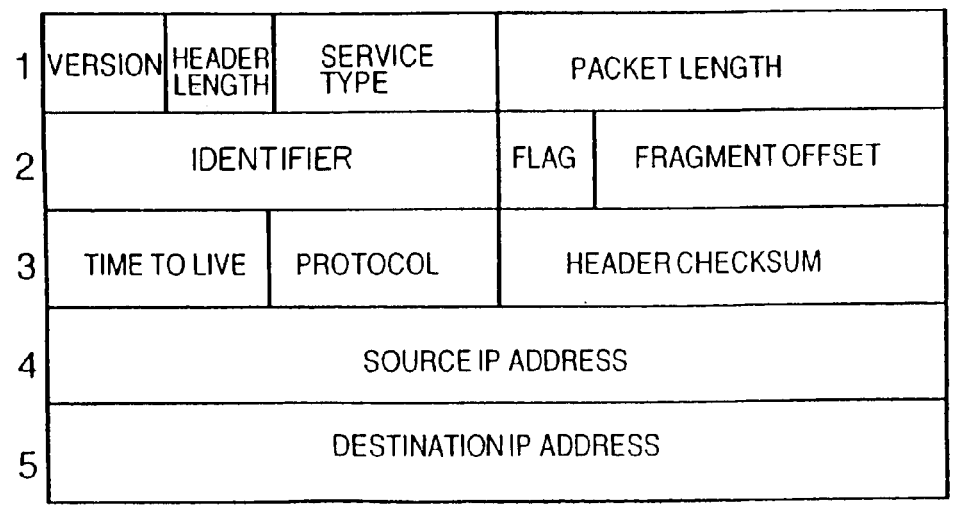
FIG. 11B is an explanatory diagram of a format for an IPv4 header.
Figure 12A:
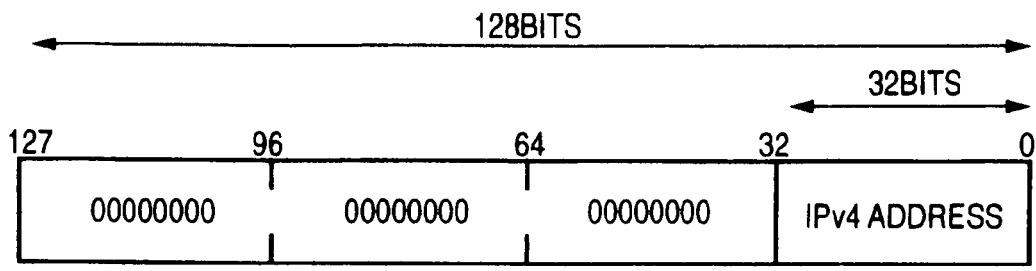
FIG. 12A is an explanatory diagram of a format for an IPv4-compatible-IPv6 address.
Figure 12B:
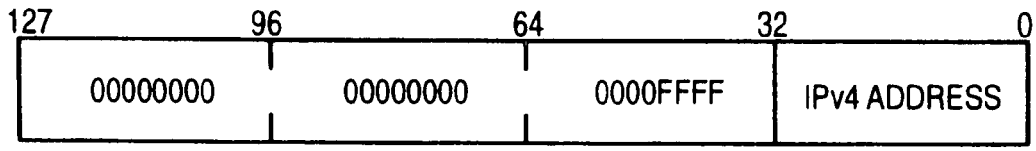
FIG. 12B is an explanatory diagram of a format for an IPv4-mapped-IPv6 address.
Figure 13:
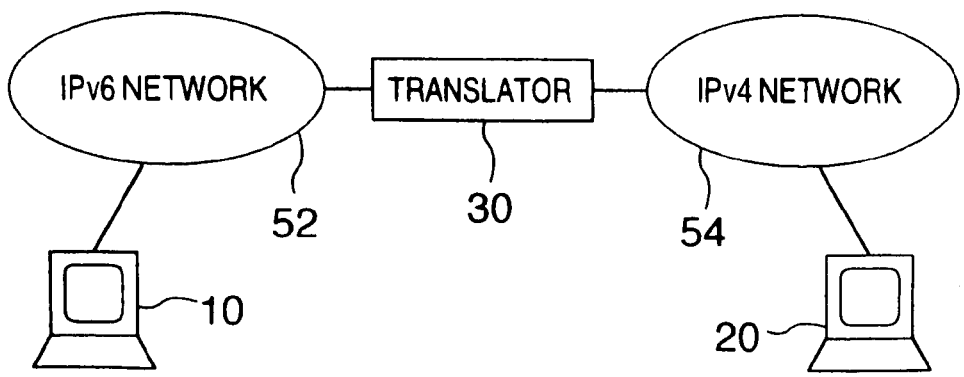
FIG. 13 is an explanatory diagram illustrating a conventional scheme for connecting an IPv4 network and an IPv6 network.

As illustrated in FIG. 1, an embodiment of the present invention assumes an environment which allows coexistence of an IPv6 network 52 to which a plurality of IPv6 hosts 51 are connected and an IPv4 network 54 in which a plurality of IPv4 hosts 53 are connected, where these networks are interconnected through an IPv6/IPv4 translator 55 (hereinafter called "translator 55"). In the IPv6 network 52, a data is transferred through a packet having the IPv6 header shown in FIG. 11A (hereinafter called "IPv6 packet"). In the header of the IPv6 packet, an IPv6 host 51 is represented by a normal IPv6 address, while an IPv4 host 53 is represented by an IPv4-mapped-IPv6 address (FIG. 12B). In the IPv4 network 54, a data is transferred through a packet having the IPv4 header shown in FIG. 11B (hereinafter called "IPv4 packet"). In the header of the IPv4 packet, the translator 55 is represented by an IPv4 address assigned by the translator 55 itself or by a particular IPv4 host 53, and each IPv4 host 53 is represented by a normal IPv4 address.

Figure 2:
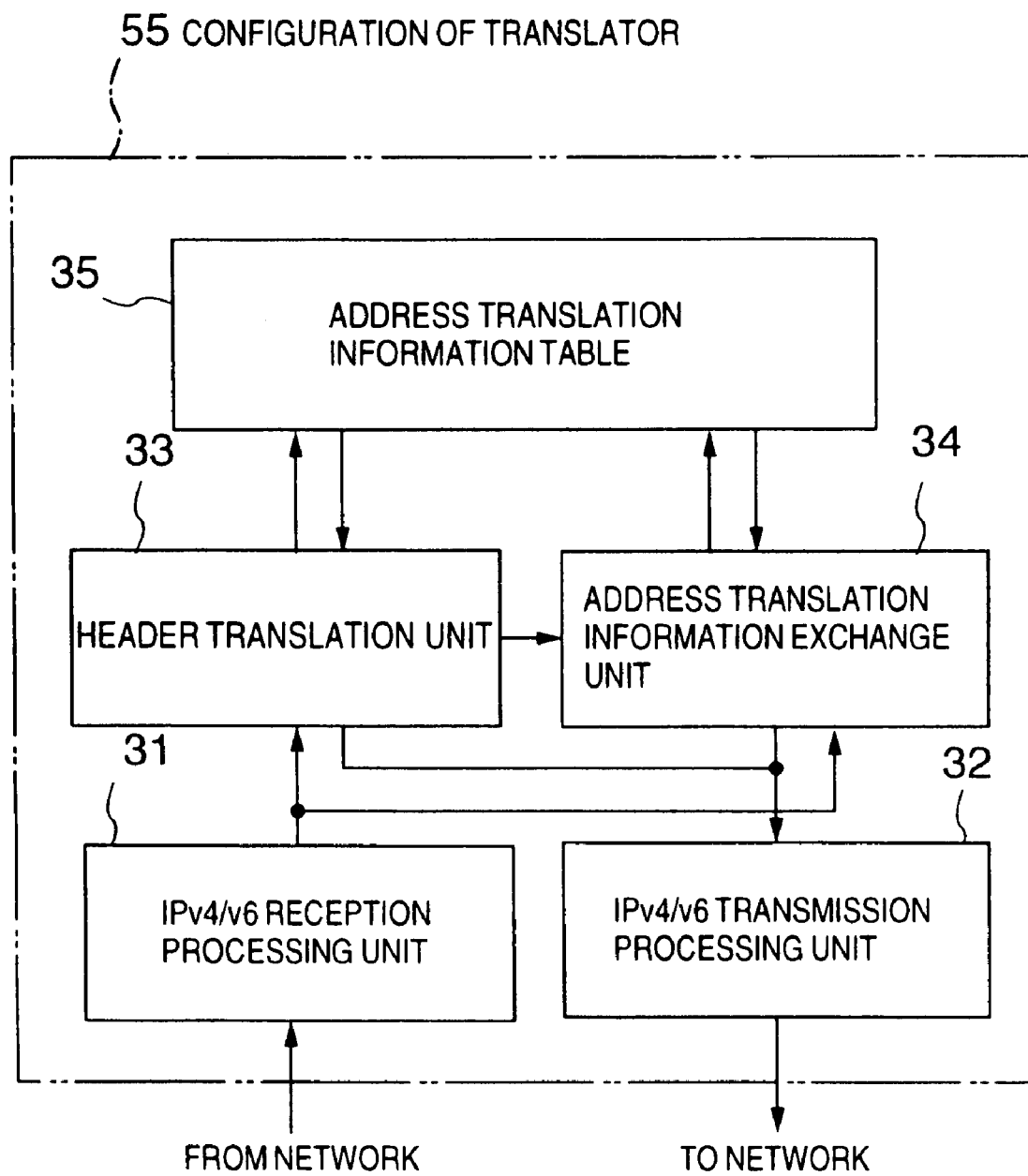
FIG. 2 is a block diagram illustrating functions of an IPv4/IPv6 translator for use in the network of FIG. 1.

The translator 55, as illustrated in FIG. 2, comprises an IPv4/v6 reception processing unit 31 for sequentially fetching IPv6 packets flowing into the IPv6 network 52 and IPv4 packets flowing into the IPv4 network 54; a header translation unit 33 for translating the header of a packet fetched by the IPv4/v6 reception processing unit 31 based on address translation information stored in an address translation information table 35 and for updating the contents of the address translation information table 35 as required; an IPv4/v6 transmission processing unit 32 for sending a packet having a translated header to a network which is the destination of the packet; and an address translation information exchange unit 34 for exchanging the address translation information stored in the address translation information table 35 with address translation information stored in a particular node connected to the IPv4 network 54.

Figure 3:
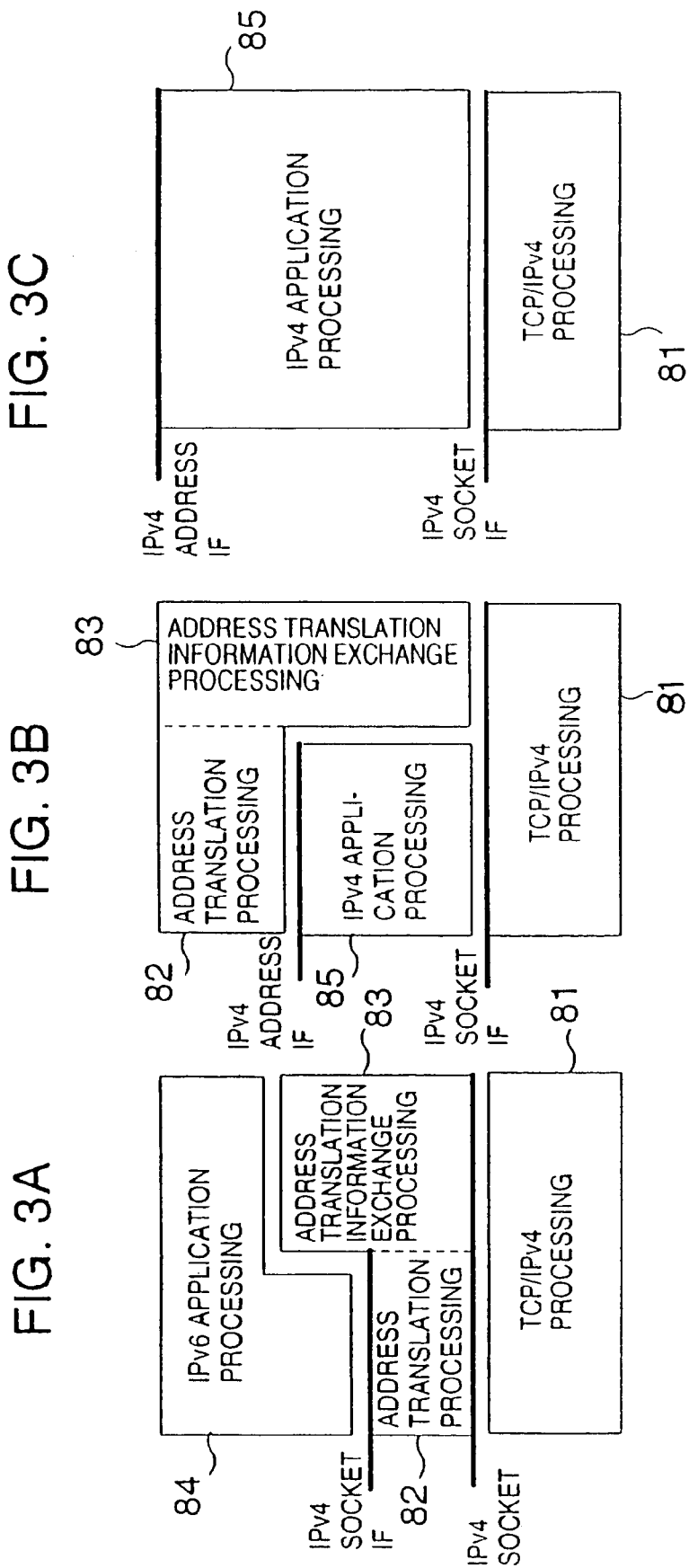
FIG. 3A is an explanatory diagram illustrating the concept of processing performed in an IPv4 host of type A connected to the network of FIG. 1.
FIG. 3B is an explanatory diagram illustrating the concept of processing performed in an IPv4 host of type B connected to the network of FIG. 1.
FIG. 3C is an explanatory diagram illustrating the concept of processing performed in an IPv4 host of type C connected to the network of FIG. 1.

In this embodiment, there are three types (hereinafter called "type A", "type B", and "type C") of IPv4 hosts 53 connected to the IPv4 network 54. An IPv4 host 53 of type A is a host which allows for installation of application programs used in IPv6 hosts 51 (hereinafter called "IPv6 application programs") and has the aforementioned address translation information. A concept of processing performed by the IPv4 host 53 of type A is illustrated in FIG. 3A. An IPv4 host 53 of type C is a conventional host which has installed therein application programs used in IPv4 hosts 53 (hereinafter called "IPv4 application programs") as they are, and peripheral devices such as a printer fall under this type. A concept of processing performed by the IPv4 host 53 of type C is as illustrated in FIG. 3C. An IPv4 host 53 of type B is a host which has installed therein IPv4 applications and has the aforementioned address translation information. A concept of processing performed thereby is as illustrated in FIG. 3B. It should be noted that the particular node with which the translator 55 exchanges the address translation information is the IPv4 host 53 of type A or type B.

TCP/IPv4 processing 81 shown in FIG. 3A corresponds to general TCP/IP communication processing which provides services in conformity to the IPv4 in this embodiment. The TCP/IPv4 processing 81 employs a socket interface (IPv4 socket IF) as an interface with processing performed at a higher level. IPv6 application processing 84 is processing performed by an IPv6 application and employs a socket interface (IPv6 socket IF) as an interface with processing performed at a lower level, similarly to the TCP/IPv4 processing 81. Address translation processing 82 and address translation information exchange processing 83 respectively interpose between the IPv4 socket IF and the IPv6 socket IF. In the address translation processing 82, a data transfer including address translation processing is performed, while in the address translation information exchange processing 83, the address translation information is exchanged between another node (for example, the translator 55) and the IPv4 host 53.

Figure 4:
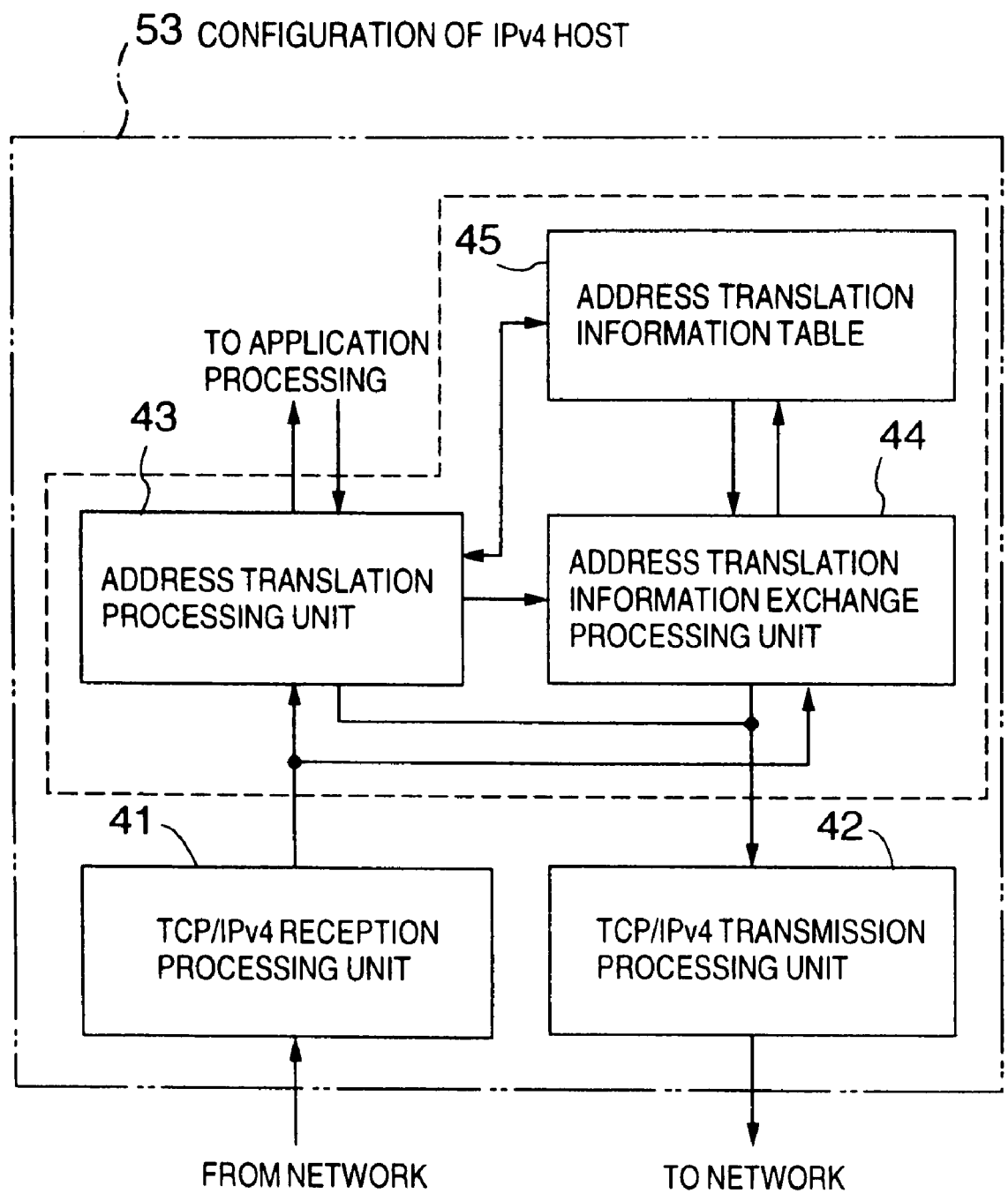
FIG. 4 is a block diagram illustrating functions of the IPv4 host of type A connected to the network of FIG. 1.

FIG. 4 illustrates the internal configuration of the IPv4 host 53 of type A.

A TCP/IPv4 reception processing unit 41 and a TCP/IPv4 transmission processing unit 42 are in charge of the TCP/IP processing 81. An address translation processing unit 43 is in charge of the address translation processing 82. An address translation information exchange processing unit 44 is in charge of the address translation information exchange processing 83. In addition, the IPv4 host 53 of type A is provided with an address translation information table 45.

Next, description is made of a packet exchange 25 performed between the IPv6 host 51 and the IPv4 host 53 of type A.

First, the packet exchange originated by a communication from the IPv6 host 51 is described with reference to a flow chart of FIG. 5. Assume in this embodiment that an IPv6 address "::1234:5678:9abc" has been previously assigned to a source IPv6 host 51, and an IPv4 address "133.144.95.22" has been assigned to a destination IPv4 host 53.

The notation of the IPv4 address is defined in accordance with the following rule:

1. the address is delimited every eight bits by a period (".") and values in respective eight bit areas are represented in decimal.

EXAMPLE: 123.3.2.1

The notation of the IPv6 address is defined in accordance with the following rules:

1. the address is delimited every 16 bits by a colon (":") and values in respective 16-bit areas are represented in hexadecimal;

EXAMPLE:
1234:5678:9abc:def0:0fed:cba9:8765:4321

2. when 16 bits in a delimited area are all zeros, this situation may be represented by "::"; cl EXAMPLE: 1234::9abc:def0:0fed:cba9:8765:4321

3. when 16 bits in successive delimited areas are all zeros, this situation may be represented by a single "::";

EXAMPLE: 1234::4321

4. when an IPv4 address is included in the lower 32 bits, the IPv4 address notation may be used for the lower 32 bits.

EXAMPLE: ::ffff:133.144.9522

Then, when the IPv6 host 51 sends the IPv6 packet 56 to the IPv6 network 52 (at), the IPv6 host 51 sets its own IPv6 address "::1234:5678:9abc" as the source IP address, and the IPv4-mapped-IPv6 address of the IPv4 host 53 "::ffff:133.144.9522" as the destination IP address in the header of the IPv6 packet 56.

The IPv4/v6 reception processing unit 31 of the translator 55 sequentially fetches IPv6 packets following through the IPv6 network 52, and determines, every time an IPv6 packet is fetched, whether or not the fetched IPv6 packet has an IPv4-mapped-IPv6 address stored in the "destination IP address" (specifically, a packet with the "destination IP address" field having 47th to 32nd bits set at "1" and all bits higher than them set at "0"). If the specified packet is found, this packet is sent to the header translation unit 33 (b1). The header translation unit 33, upon receiving the packet, extracts the IPv6 address, which is the source IP address, included in the packet, and searches out an IPv4 address which has previously corresponded to the extracted IPv6 address from the address translation information table 35 (b2). If the required IPv4 address does not exist in the address translation information table 35, the header translation unit 33 assigns a certain IPv4 address to the abovementioned IPv6 address. In this case, an IPv4 address "192.168.10.3" is assigned to the IPv6 address "::1234:5678.9abc" (b3). The address translation information exchange unit 34 transmits the corresponding relationship between these addresses to the IPv4 host 53 as address translation information (b4). A format for a packet used to exchange the address translation information is as shown in FIG. 8. In this embodiment, "::1234:5678.9abc" is stored in an "IPv6 address" field 101, and "192.168.10.3" is stored in an "assigned IPv4 address" field 102. An "option" field 103 shown in FIG. 8 can store a variety of control information required for communications, though not used specifically in this embodiment. It should be noted that the transmission of the address translation information at (b4) is performed not only to the IPv4 host 53 specified as a communication party but also all IPv4 hosts 53 having the address translation information table 45. Also, the header translation unit 33 stores the address translation information in the address translation information table (b5).

An exemplary structure of the address translation information table 35 is shown in FIG. 7. The shown address translation information table 35 is composed of an IPv6 address storing field 91; an assigned IPv4 address storing field 92; and optional storing field 93, which are filled in succession on a line-by-line basis. A plurality of IPv4 addresses to be assigned have previously been prepared and stored in a memory, not shown, in the translator 55. The address translation information table 35 itself is also stored in this memory.

Since a region in which assigned IPv4 addresses are used is closed in an associated IPv4 network, no problem will occur even if the same IPv4 address is used, for example, in a plurality of different IPv4 networks connected to a single IPv6 network 52. In other words, assuming that the IPv4 network 54 is an in-house communication network of a company and the IPv6 network 52 is an external communication network connected thereto through a public line, the company can assign IPv4 addresses which may possibly be used in an IPv4 network of any other company.

Subsequently, the header translation unit 33 replaces the source IP address in the packet from the IPv6 address "::1234:5678:9abc" with the IPv4 address "192.168.10.3". For the destination IP address, the IPv4 address extracted from the lower 32 bits of the IPv6 address is used. In addition, the header translation unit 33 simultaneously executes a variety of processing for translating the IPv6 header into the IPv4 header (b6). Subsequently, the IPv4/v6 transmission processing unit 32 sends the packet subjected to the translation processing at (b6) to the IPv4 host 53. If a corresponding address is found in the search processing at (b2), the found IPv4 address is employed as the source IP address, and therefore the processing at (b3), (b4), and (b5) are skipped.

The IPv4 host 53, upon receiving the address translation information sent from the translator 55 (c1), updates the contents of the address translation information table 45 using the received address translation information (c2). This results in the contents of the address translation information table 35 in the translator 55 matching with the contents of the address translation information table 45 in the IPv4 host 53. The update of the contents of the address translation information table 45 is actually carried out by the address translation information exchange unit 44. The processing at (c1) and (c2) is performed not only for the IPv4 host which serves as a communication party but also for all IPv4 hosts. Also, the IPv4 host 53, upon receiving the IPv4 packet sent from the translator 55 (c3), translates the address in the received IPv4 packet based on the updated address translation information table 45.

Specifically, the TCP/IPv4 reception processing unit 41 of the IPv4 host 53 receives the foregoing IPv4 packet flowing through the IPv4 network in accordance with TCP/IP, and passes the IPv4 packet to the address translation processing unit 43. The address translation processing unit 43, upon receiving the packet, extracts the IPv4 address "192.168.10.3", which is the source address of the packet, and searches out an IPv6 address which has corresponded to the extracted IPv4 address from the address translation information table 45. Since the contents of the address translation information table 45 have been updated at (c2), the IPv6 address "::1234:5678.9abc" is extracted here. The address translation processing unit 43 sets the IPv6 address "::1234:5678.9abc" as the source IP address in the packet, and sends this packet to the IPv6 application. Used as the destination IP address is an IPv6 address which is extended to the IPv4-mapped-IPv6 address shown in FIG. 12B from the IPv4 address. When such an address translation is performed, the IPv6 application can receive both the source IP address and the destination address in the form of the IPv6 address. Since the IPv6 application is an application program developed for the IPv6 as mentioned above, it is more convenient that a received IP address is represented in the form of the IPv6 address.

In addition, the IPv6 application may send a packet to the IPv6 host 51 as response processing. In this event, the IPv6 application sets, in a packet to be sent, an IPv6 address "::ffff:133.144.95.22" extended from its own IPv4 address "133.144.95.22" to the IPv4-mapped-IPv6 address shown in FIG. 12B, as the source IP address, and the IPv6 address "::1234:5678.9abc" of the IPv6 host 51 as the destination address. This packet is passed to the address translation processing unit 43 and undergoes an address translation reverse to the aforementioned one specifically the address translation processing unit 43 replaces the aforementioned IPv6 address "::1234:5678.9abc" set in the packet as the destination IP address with the IPv4 address "192.168.10.3". For the source IP address, the IPv4 address extracted from the lower 32 bits of the IPv6 address is used. Subsequently, the TCP/IPv4 transmission processing unit 42 sends the packet subjected to the translation processing in the address translation processing unit 43 (IPv4 packet 57 in FIG. 1) to the translator 55 (c4).

The IPv4/v6 reception processing unit 31 of the translator 55 fetches an IPv4 packet 47 flowing through the IPv4 network 54 (b8), and passes the fetched IPv4 packet 57 to the header translation unit 33. The header translation unit 33, upon receiving the packet, extracts the IPv4 address "192.168.10.3", which is the destination IP address of the packet, and searches out an IPv6 address which has corresponded to the extracted IPv4 address from the address translation information table 35. Here, the IPv6 address "::1234:5678.9abc" is retrieved (b9). Subsequently, the header translation unit 33 sets an IPv4-mapped-IPv6 address "::ffff:133.144.95.22" of the IPv4 host 53 as the source IP address and the previously extracted IPv6 address "::1234:5678:9abc" as the destination IP address in the packet. In addition, the header translation unit 33 simultaneously executes a variety of processings for translating the IPv4 header into the IPv6 header other than the address translation as mentioned above (b10). The IPv4/IPv6 transmission processing unit 32 sends the packet subjected to the translation processing at (b10) to the IPv6 host 51 (b11). Subsequently, the IPv6 host 51 receives this packet (a2).

The foregoing IPv4 address which has corresponded to the IPv6 address may be released at the time a sequence of communications have been terminated between the IPv6 host 51 and the IPv4 host 53. Also, an entry in the address translation information table may be deleted in accordance with a command or the like issued for system management of the network. Further, the option field of the address translation information table may be used to store a time period elapsed from the time an assigned IPv4 address is not used in communication such that the assigned IPv4 address may be forcedly released at the time a predetermined time has expired.

Next, a packet exchange will be described with reference to a flow chart of FIG. 6 for the case a communication is started from the IPv4 host 53.

Assume herein, similarly to the foregoing, that an IPv6 address "::1234:5678.9abc" has been assigned to the IPv6 host 51, and an IPv4 address "133.144.95.22" has been assigned to the IPv4 host 53. The IPv6 application of the IPv4 host 53 sets its own IPv4 address "133.144.95.22" as the source IP address and sets the IPv6 address "::1234:5678:9abc" of the IPv6 host 51 as the destination IP address in a packet to be sent. This packet is passed to the address translation processing unit 43. The address translation processing unit 43, upon receiving the packet, extracts the IPv6 address, which is the destination IP address, included in the packet, and searches out an IPv4 address which has previously corresponded to the extracted IPv6 address from the address translation information table 45 (c1). If a required IPv4 address does not exist in the address translation information table 45, the address translation processing unit 43 assigns a certain IPv4 address to the aforementioned IPv6 address. Assume herein that an IPv4 Address "192.168.10.3" is assigned to the IPv6 address "::1234:5678.9abc" (c2). The address translation processing unit 43 transmits the corresponding relationship between these addresses to the translator 55 as address translation information (c3). A format for a packet used to exchange the address translation information is as shown in FIG. 8. The address translation processing unit 43 also stores the address translation information in the address translation information table 45 (c4). An exemplary structure of the address translation information table 45 is shown in FIG. 7. A plurality of IPv4 addresses to be assigned have previously been prepared and stored in a memory, not shown, in the IPv4 host 53. The address translation information table 45 itself is also stored in this memory. Subsequently, the address translation processing unit 43 replaces the IPv6 address "::1234:5678.9abc" in the packet with the IPv4 address "192.168.10.3". The source IP address is maintained as it is. In addition, the address translation processing unit 43 simultaneously executes a variety of processings for translating the IPv6 header into the IPv4 header other than the address translation as mentioned above (c5) subsequently, the TCP/IPv4 transmission processing unit 42 sends the packet subjected to the translation processing in the address translation processing unit 43 (IPv4 packet 57 in FIG. 1) to the translator 55 (c6). If a corresponding IPv4 address is found in the search processing at (c1), this IPv4 address is employed as the source IP address, and therefore the respective processing at (c2), (c3), and (c4) are skipped.

The translator 55, upon receiving the address translation information sent from the IPv4 host 53 (c1), updates the contents of the address translation information table 35 using the received address translation information (b2). This results in the contents of the address translation information table 45 in the IPv4 host 53 matching with the contents of the address translation information table 35 in the translator 55. The update of the contents of the address translation information table 35 is actually carried out by the address translation information exchange unit 34. The transmission of the address translation information at (c3) is performed not only for the translator 55 but also for all IPv4 hosts 53 having the address translation information table 45, so that the contents of the address translation information tables 45 are updated in the respective IPv4 hosts 53. This prevents the same IPv4 address from being assigned to the respective IPv4 hosts 53 and to the translator 55.

Then, the IPv4/v6 reception processing unit 31 of the translator 55 fetches an IPv4 packet flowing through the IPv4 network 54 (b3), and passes the fetched IPv4 packet to the header translation unit 33. The header translation unit 33, upon receiving the packet, extracts the IPv4 address "192.168.10.3", which is the destination IP address of the packet, and searches out an IPv6 address corresponded to the extracted IPv4 address from the address translation information table 35. Since the contents of the address translation information table 35 have been updated at (b2), the IPv6 address "::1234:5678:9abc" is extracted here (b4). Subsequently, the header translation unit 33 sets an IPv4-mapped-IPv6 address "::ffff:133.144.95.22" of the IPv4 host 53 as the source IP address and the previously extracted IPv6 address "::1234:5678:9abc" as the destination IP address in the packet. In addition, the header translation unit 33 simultaneously executes a variety of processings for translating the IPv4 header into the IPv6 header other than the address translation as mentioned above (b5). Then, the IPv4/IPv6 transmission processing unit 32 sends the packet subjected to the translation processing at (b5) to the IPv6 host 51 (b6). Subsequently, the IPv6 host 51 receives this packet (a1).

Also, the IPv6 host 51 may send the IPv6 packet 51 to the IPv4 host 53 as application processing. In this event, the IPv6 host 51 sets its own IPv6 address "::1234:5678:9abc" as the source IP address and the "IPv4-mapped-IPv6 address "::ffff: 133.144.95$^{22}$" of the IPv4 host 53 as the destination IP address in the header of the IPv6 packet 56, when sending the IPv6 packet 56 to the IPv6 network 52 (a2). This IPv6 packet 56 is sent to the IPv4 host 53 through the translator 55 (c7). Since the processing performed by the translator 55 (at (b7), (b8), (b9), (b10)) is similar to that of (b1), (b2), (b6), (b7) in FIG. 6, explanation thereof is not repeated here.

For the aforementioned IPv4 address assigned to the IPv6 address, the release processing may be performed in a manner similar to the aforementioned one.

Next, the IPv4 host 53 of type B will be described. As mentioned above, the IPv4 host 53 of type B is a host having an IPv4 application installed therein and possesses the aforementioned address translation information. The IPv4 host 53 of type B performs TCP/IPv4 processing 81, address translation processing 82, address translation information exchange processing 83, and IPv4 application processing 85, as illustrated in FIG. 3B. The IPv4 application processing 85 is executed on the TCP/IPv4 processing 81 through an IPv4 socket interface, as illustrated in FIG. 3B. The hierarchical structure of the processing is the same as that of the conventional IPv4 host 53, and in the IPv4 application processing 85, the IP address of a packet sent up from the TCP/IPv4 processing 81 is received by an IPv4 address. The TCP/IPv4 reception processing unit 41 and the TCP/IPv4 transmission processing unit 42 is in charge of the TCP/IPv4 processing 81. The address translation processing unit 43 is in charge of the address translation processing 82. The address translation information exchange processing unit 44 is in charge of the address translation information exchange processing 83.

Thus, the application side does not particularly require an IPv6 address in the IPv4 host 53 of type B. However, some users may desire to know the IPv6 address of a communication party for confirmation or the like.

For user's convenience, the IPv4 host 53 of type B outputs the IPv6 address of a communication party on a display screen or the like. Specifically, the address translation processing unit 43 of the IPv4 host 53 of type B, upon receiving a packet outputted from the IPv4 application, extracts an IPv4 address, which is the source IP address of the packet, searches out an IPv6 address corresponding to the extracted IPv4 address from the address translation information table 45, and outputs the IPv6 address on the display screen or the like.

Further, the IPv4 host 53 of type B allows the user to arbitrarily make correspondence between the IPv6 address and the IPv4 address which is automatically performed in the translator and the IPv4 host of type A. Specifically, the address translation processing unit 43 updates the address translation information table 45 in accordance with the contents of operation performed by the user. For example, if the user assigns an IPv4 address "192.168.10.3" to an IPv6 address "::1234:4567:9abc", the address translation information table 45 is set to the contents, for example, as shown in FIG. 7. After the address translation information table 45 has been updated, the address translation information exchange unit 34 creates a packet including the updated portion (see FIG. 8) and transmits the packet to other IPv4 hosts 53 which possess the address translation information tables. This results in the contents of the address translation information tables 45 in the respective IPv4 hosts 53 matching with the contents of the address translation information table 35 in the translator 55.

Since a packet exchange performed between the IPv6 host 51 and the IPv4 host 53 of type B is achieved by a processing flow similar to that described previously with reference to FIGS. 5 and 6, explanation thereof is omitted.

Next, the IPv4 host 53 of type C will be described. The IPv4 host 53 of type C is, as mentioned previously, a host which has installed therein an IPv4 application used in the IPv4 host 53 as it is. A host which has an IPv4 application implemented in the form of ROM and therefore cannot modify the IPv4 application by software without external aid is also included in the type C host 53. In the IPv4 host 53 of type C, IPv4 application processing 85 is executed on TCP/IPv4 processing 81 through an IPv4 socket interface, as illustrated in FIG. 3C. The TCP/IPv4 reception processing unit 41 and the TCP/IPv4 transmission processing unit 42 is in charge of the TCP/IPv4 processing 81.

It should be noted that although the IPv4 host 53 of type C is not allowed to initiate a communication due to its configuration, communications can be initiated from the other party to the IPv4 host 53 of type C without problems as described below.

The IPv4 application in the IPv4 host 51 of type C, upon receiving a packet outputted from the TCP/IPv4 reception processing unit 41, extracts the source IP address and the destination IP address of the received packet, and performs predetermined processing specified by a data portion of the received packet. Subsequently, the IPv4 application packs the processing results in the packet, if required, and passes the packet to the TCP/IPv4 transmission processing unit 42. In this event, the IPv4 application replaces the extracted destination IP address and source IP address with each other and sets them in the packet. For example, when an IPv4 address "3.144.95.22" is stored in the "destination IP address" field of the received packet and an IPv4 address "192.168.10.3" is stored in the "source IP address" field of the same, the IPv4 address "192.168.10.3" is stored in the "destination IP address" field and the IPv4 address "133.144.95.22" is stored in the "source IP address" field. This packet is sent to the IPv4 network 54 by the TCP/IPv4 transmission processing unit 42 to be delivered to the translator 55.

Figure 10A:
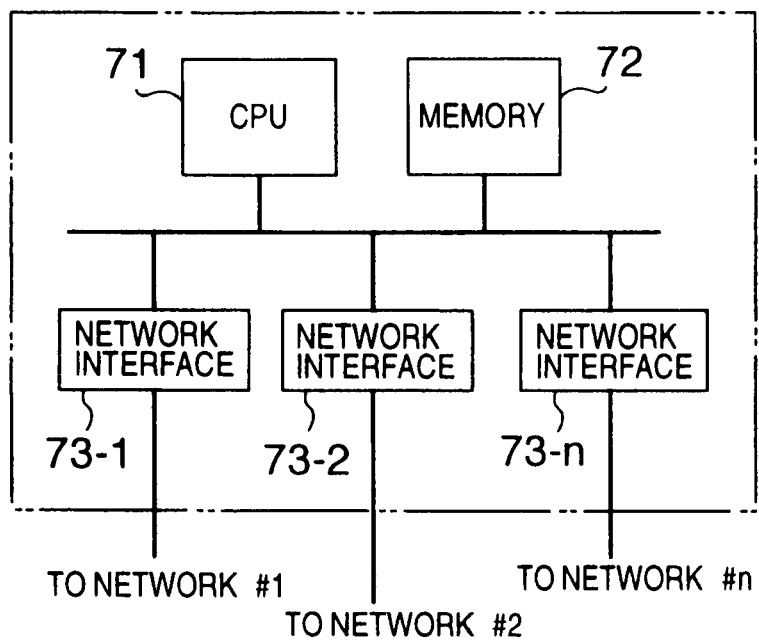
FIG. 10A is a schematic diagram illustrating an exemplary hardware configuration of the IPv4/IPv6 translator connected to a network to which the present invention is applied.

Thus, the embodiment has been described for the case where the IPv4 network and the IPv6 network are connected through the IPv4/v6 translator, where actual hardware of the IPv6/v4 translator used herein is configured, for example, as illustrated in FIG. 10A.

The IPv6/v4 translator is composed of a CPU 71 a memory 72, and network interfaces 73-1, 73-2, . . . , 73-n. The CPU 71 serves to manage the memory 72 and control the network interfaces 73-1, 73-2, . . . , 73-n. The memory 72 previously stores a variety of programs which are executed by the CPU 71 as required to implement the IPv4/v6 reception processing unit 31, the IPv4/v6 transmission processing unit 32, the header translation unit 33, the address translation information exchange unit 34, and the address translation information table 35, all illustrated in FIG. 2.

It should be noted that since one each of the IPv6 network 51 and the IPv4 network 54 exist in FIG. 1, the network interface 73-1 is used for IPv6 network 52, and the network interface 73-2 is used for the IPv4 network 54, by way of example. In this case, the network interface 73-1 fetches an IPv6 packet flowing through the IPv6 network 52 and stores it in the memory 72, while the network interface 73-2 sends an IPv4 packet, produced by a header translation and so on, to the IPv4 network 54. When a packet is sent in the opposite direction, the network interfaces 73-1, 73-2 perform operations reverse to the foregoing. If a plurality of IPv6 and IPv4 networks exist, a number of network interfaces will be used corresponding to the number of networks.

Figure 10B:
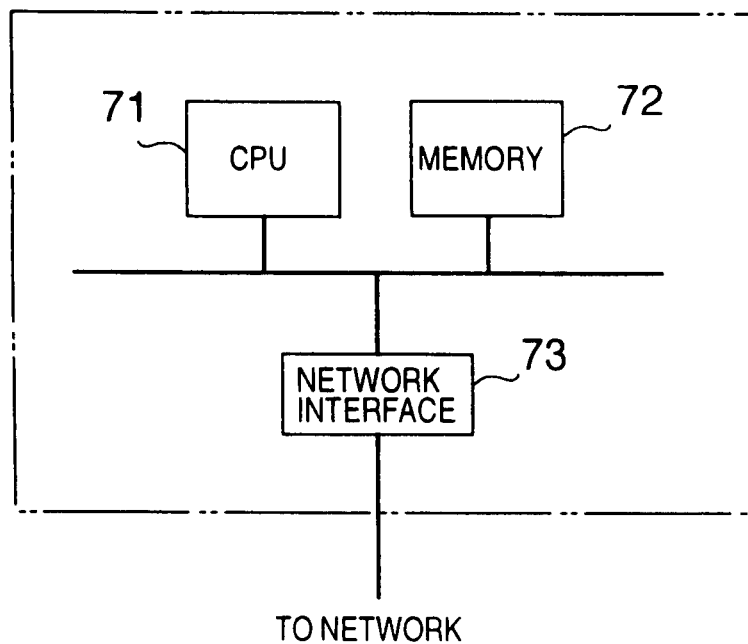
FIG. 10B is a schematic diagram illustrating an exemplary hardware configuration of the IPv4 host connected to a network to which the present invention is applied.

Actual hardware of the IPv4 host is configured, for example, as illustrated in FIG. 10B. The IPv4 host is composed of a CPU 71, a memory 72, and a network interface 73. The CPU 71 serves to manage the memory 72 and control the network interface 73. The memory 72 previously stores a variety of programs. For example, in the IPv4 host of 5 type A, the programs in the memory 72 are executed by the CPU 71 as required to realize the TCP/IPv4 reception processing unit 41, the TCP/IPv4 transmission processing unit 42, the address translation processing unit 43, the address translation information exchange processing unit 44, the address translation information table 45, and the IPv4 application. The network interface 73 fetches an IPv4 packet flowing through the IPv4 network 54 and stores it in the memory 72 as well as sends an IPv4 packet, produced by an address translation and so on, to the IPv4 network 54.

For a particular IPv6 host, an IPv4 address may have been previously assigned thereto and stored in the address translation information table. In this way, a processing time required to the assignment is reduced.

Figure 9:
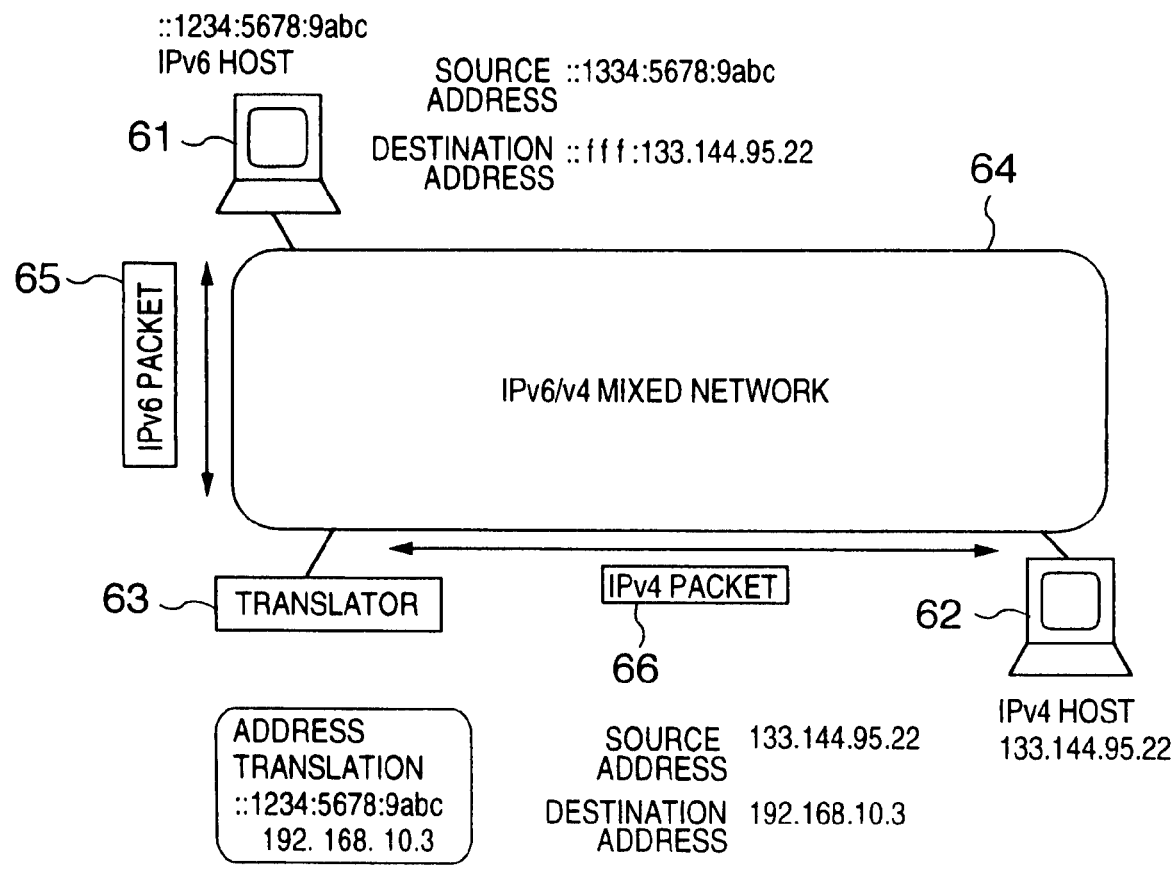
FIG. 9 is a schematic diagram illustrating another example of a network to which the present invention is applied.

It will be understood that the present invention is not limited to the network configuration as illustrated in FIG. 1. For example, the present invention may also be applied to a network system which permits coexistence of an IPv4 network and an IPv6 network. FIG. 9 illustrates an IPv4/IPv6 mixed network 64 to which an IPv4 host 62 and an IPv6 host 61 are connected. While the IPv4/v6 mixed network 64 has coexistent IPv4 packets 66 and IPv6 packets 65, an IPv4/v6 translator 63 fetches these packets thereinto, performs the foregoing address translation and header translation for the fetched packets, if required, and returns the processed packets to the network. This enables the IPv4 host 62 and the translator 63 to communicate through the IPv4 packet, and the translator 63 and the IPv6 host 61 to communicate through the IPv6 packet 65.

Further, the present invention is not limited to the coupling of an IPv4 network and an IPv6 network, but may be applied to two kinds of networks (a first class IP network and a second class IP network) which are different in IP addressing architecture due to a difference in version or the like.

Figure 5:
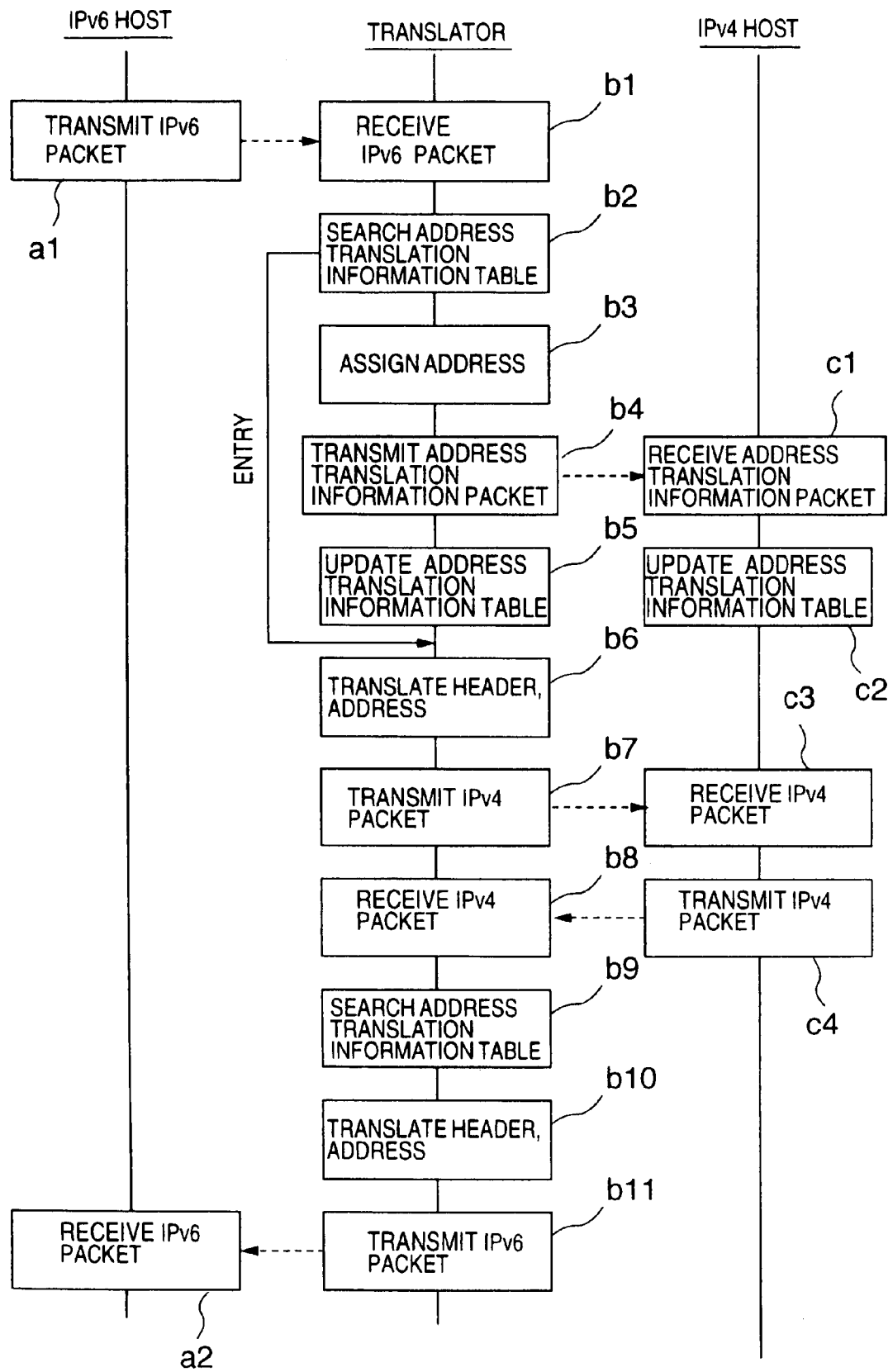
FIG. 5 is a flow chart representing a communication procedure (No. 1) applied to communications between an IPv6 host and an IPv4 host in the network of FIG. 1.
Figure 6:
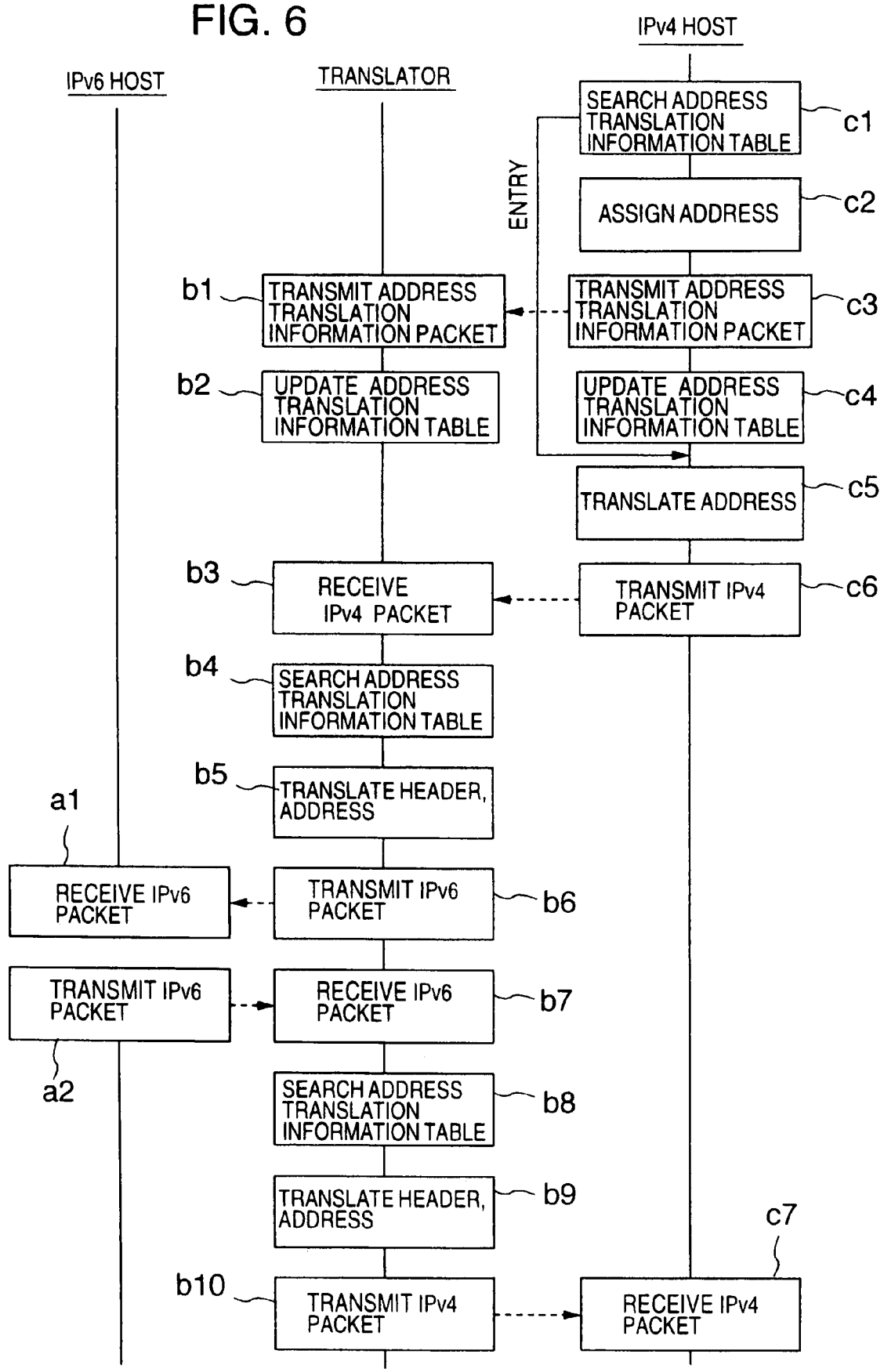
FIG. 6 is a flow chart representing a communication procedure (No. 2) applied to communications between an IPv6 host and an IPv4 host in the network of FIG. 1.

The software programs performing the processings for the translation as shown in FIGS. 5 and 6 may be stored in a computer-readable recording medium such as a semiconductor memory or a recording disk.

According to the present invention, at the time a communication is initiated between an device of interest A which is one of a plurality of devices of interest belonging to a first class IP network (for example, the IPv4 network) and an device of interest B which is one of a plurality of devices of interest belonging to a second class IP network (for example, the IPv6 network), a translator disposed between the first class IP network and the second class IP network or the device of interest A assigns an IP address of a first class to an IP address of a second class assigned to the device of interest B, such that the communication is carried out using this IP address of the first class in the first class IP network.

It is therefore possible to eliminate useless addressing, i.e., the previous assignment of an IP address of the first class to the device of interest B belonging to the second class IP network for communicating with the device of interest A belonging to the first class IP network, thus effectively utilizing a small number of IP addresses of the first class.

Also, the IP address of the first class assigned to the device of interest A is used only within the first class network, so that even if the same IP address is used in other external networks, any problem will not occur due to the duplicated IP address, thereby making it possible to more effectively utilize the IP addresses of the first class.

What is claimed is:

1. A method of rendering communications between first and second devices, said first device using Internet Protocol version 6 (IPv6) as a communication protocol, and said second device using Internet Protocol version 4 (IPv4) as a communication protocol, comprising the steps of:
   receiving from said first device, an IPv6 packet having an IPv6 header;
   judging whether an IPv4-mapped-IPv6 address is stored in a destination address of said IPv6 header;
   when said judging step judges that the IPv4-mapped-IPv6 address is stored, extracting lower 32 bits from said IPv4-mapped-IPv6 address to create the extracted lower 32 bits as a translated IPv4 address;
   translating said IPv6 header into an IPv4 header including said translated IPv4 address as a destination address;
   creating an IPv4 packet having said translated IPv4 header from said IPv6 packet; and
   sending said created IPv4 packet to said second device.

2. A method according to claim 1, further comprising the steps of:
   holding at least one IPv4 address;
   assigning to an IPv6 address of said first device included in said IPv6 header as a source address, any of said held at least one IPv4 address; and in the step of translating said IPv6 header, translating said IPv6 header into said IPv4 header including the assigned IPv4 address of said held at least one IPv4 address as the source address.

3. A method according to claim 2, further comprising the step of:

storing said IPv6 address of the first device and the assigned IPv4 address to correlate with each other.

4. A method according to claim 2, further comprising the step of:

sending address translation information, including the IPv6 address of said first device and said any IPv4 address assigned to the IPv6 address of said first device, to said second device.

5. A method according to claim 1, further comprising the steps of:

pre-storing an IPv6 address of said first device and any IPv4 address to correlate with each other;

translating IPv6 address of said first device included in said IPv6 header as a source address into said any IPv4 address pre-stored to correlate with the IPv6 address; and in said IPv6 header translating step, translating said IPv6 header into said IPv4 header including said IPv4 address as a source address.

6. A method of rendering communications between first and second devices, said first device using a first class protocol and having an assigned address of a first length, and said second device using said second class protocol and having an assigned address of a second length, said method comprising the steps of:

receiving from said first device a first class packet having a first class header and being communicated using a first class protocol;

judging whether an address of a format indicating to include an address of said second class protocol is stored in a destination address of said first class header;

when said judging step judges that the address of a format indicating to include an address of said second class protocol, extracting said second address from said address of a format indicating to include an address of said second class protocol to create the extracted second address as a translated address of said second class protocol;

translating said first class header into a second class header including the translated address of said second class protocol as a destination address and different from said first class header in header format;

creating a second class packet having said translated second class header from said first class packet and being communicated using said second class protocol; and sending said created second class packet to said second device.

7. A method according to claim 6, further comprising the steps of:

holding at least one address of the second class protocol;

assigning to said first address included in said first class header as a source address, any of said held at least one address of the second class protocol; and in the step of translating said first class header, translating said first class header into second class header including the assigned address of said held at least one address of the second class protocol as the source address.

8. A method according to claim 7, further comprising the step of:

storing said first address and the assigned address of said held at least one address of the second class protocol to correlate with each other.

9. A method according to claim 7, further comprising the step of:

sending address translation information including said first address and said address assigned to said first address, to said second device.

10. A method according to claim 6, further comprising the steps of:

pre-storing said first address and any of addresses of the second class protocol to correlate with each other;

translating said first address included in said first class header as a source address into any address pre-stored to correlate said first address; and in said first class header translating step, translating said first class header into said second class header including said any address as a source address.

* * * * *